(12) United States Patent
Lu et al.

(10) Patent No.: US 8,459,568 B2
(45) Date of Patent: Jun. 11, 2013

(54) TEMPERATURE MODERATION SYSTEM AND METHOD WITH TEMPERATURE DIFFERENCE CONSIDERATIONS BETWEEN INDOORS AND OUTDOORS

(75) Inventors: Bing-Hui Lu, Sanchong (TW); Yu-Fan Lin, Taipei (TW); Chang-Yi Kao, Taipei (TW)

(73) Assignee: Institute For Information Industry, Taipei (TW)

( * ) Notice: Subject to any disclaimer, the term of this patent is extended or adjusted under 35 U.S.C. 154(b) by 875 days.

(21) Appl. No.: 12/620,708

(22) Filed: Nov. 18, 2009

(65) Prior Publication Data

US 2011/0049252 A1 Mar. 3, 2011

(30) Foreign Application Priority Data

Sep. 2, 2009 (TW) .............................. 98129569 A

(51) Int. Cl.
*G05D 23/19* (2006.01)

(52) U.S. Cl.
USPC ........ 236/91 D; 236/91 R; 236/91 F; 236/51; 236/1 C; 62/208; 700/276

(58) Field of Classification Search
USPC 236/91 R, 91 D, 91 F, 91 E, 51, 1 C; 62/208; 700/276
See application file for complete search history.

(56) References Cited

U.S. PATENT DOCUMENTS 5,573,180 A * 11/1996 Werbowsky et al. ....... 236/46 R
6,990,820 B2 * 1/2006 Park ............................... 62/115

FOREIGN PATENT DOCUMENTS

CN 2729772 9/2005
TW 524959 3/2003

OTHER PUBLICATIONS

English language translation of abstract of TW 524959.
English language translation of abstract of CN 2729772 (published Sep. 28, 2005).

* cited by examiner

*Primary Examiner* — Cheryl J Tyler
*Assistant Examiner* — Jonathan Bradford
(74) *Attorney, Agent, or Firm* — McClure, Qualey & Rodack, LLP

(57) ABSTRACT

A temperature moderation system with temperature difference considerations between indoors and outdoors for facilitating an air conditioner in operation control, includes an indoor unit and an outdoor unit connected with each other. The outdoor unit has an outdoor temperature detection element. The indoor unit has a processor for generating and sending a target temperature to the air conditioner for operation control. The target temperature is one selected from the indoor setting temperature and a pre-set temperature; according to which temperature is closest to the outdoor temperature.

31 Claims, 6 Drawing Sheets

TEMPERATURE MODERATION SYSTEM AND METHOD WITH TEMPERATURE DIFFERENCE CONSIDERATIONS BETWEEN INDOORS AND OUTDOORS

RELATED APPLICATIONS

This application claims priority to Taiwan Application Serial Number 98129569, filed Sep. 2, 2009, which is herein incorporated by reference.

BACKGROUND

1. Technical Field

This disclosure relates to a temperature moderation system, and more particularly to a temperature moderation system with temperature difference considerations between indoors and outdoors, its device, its air condition device, and its method thereof.

2. Description of Related Art

A conventional air-conditioning device (called AC device hereinafter), including a household cooling/heating device, or an AC system of business office buildings etc, provides users to set a target temperature only by a remote control or a far-end server system. As the target temperature of the AC device is set up, the AC device (or its remote control) will compare a detected indoor temperature with the target temperature, and determine whether the detected indoor temperature matches with the target temperature. When the detected indoor temperature does not match with the target temperature, the AC device starts to work such as running an air compressor therein for lowering the indoor temperature, or running the heater therein for raising up the indoor temperature. Until the AC device finds out a new detected indoor temperature matching with the target temperature, the AC device will stop to operate.

However, it does not matter if the AC device is designed for human beings, for cooling machine, or for plant breeding, the AC device is not designed for temperature difference considerations between indoors and outdoors. Therefore, the AC device will continue to monitor the detected indoor temperature and the target temperature, and react the way set forth above, until the detected indoor temperature matches with the target temperature.

If the human body stays indoors for a while, the human body will get used to the room temperature moderated by the AC device. Once the human body moves out the room suddenly, the human body will be uncomfortable, even be ill, due to a huge temperature difference between indoor and outdoor.

For instance, in the summer time, people always turn on the AC device for providing enough cool air in an indoor room. When a temperature difference between indoor and outdoor is quite substantial, and the human body suddenly moves from the indoor room with a low temperature to outside with a high temperature, the human body may be easy to cause body temperature disorder, e.g. as the human body may have Blood Vessel Dilatation when moving suddenly to the outside with the high temperature. Not to mention the men with the allergy, they may be easy to degrade the health condition, as having Asthma of excitation contraction of windpipe.

Therefore, an issue of how to improve the phenomenon set forth above to relieve people who move suddenly from the indoor room to outside from getting uncomfortable should be solved immediately.

SUMMARY

Therefore, an aspect of the present invention is to present a temperature moderation system with temperature difference considerations between indoors and outdoors, its device, its air condition device, and its method thereof. Thus, by maintaining a temperature difference between indoor and outdoor to stay in a suitable range of temperature that the human body is tolerable for sudden temperature change, the human body would not be easy to get uncomfortable when the human body suddenly moves from indoors to outdoors.

Another aspect of the present invention is to present a temperature moderation system with temperature difference considerations between indoors and outdoors, and its device thereof. The temperature moderation system and its device thereof are easy to be integrated into an existing air conditioner, and thus, it simplifies a task of installation. Thus, because the existing air conditioner is not necessary to be redesigned, the present invention has cost-effective advantages.

The temperature moderation system with temperature difference considerations between indoors and outdoors, is implemented for facilitating an air conditioner in operation control. The temperature moderation system includes an outdoor unit and an indoor unit. The outdoor unit has an outdoor temperature detection element and an outdoor communication element. The outdoor temperature detection element is served for detecting an outdoor temperature. The outdoor communication element is electrically connected to the outdoor temperature detection element. The indoor unit is electrically connected to the air conditioner for receiving an indoor setting temperature. The indoor unit has an indoor communication element, a storage element, and a processor. The indoor communication element communicates with the outdoor communication element, for receiving the outdoor temperature. The storage element is electrically connected to the indoor communication element, for storing a predetermined temperature difference value, the outdoor temperature, and the indoor setting temperature. The processor is electrically connected the storage element, for generating a target temperature and sending the target temperature to the air conditioner for operation control. The target temperature is one selected from the indoor setting temperature and a pre-set temperature by which one is more approximated to the outdoor temperature, and the pre-set temperature is generated by calculating the outdoor temperature and the predetermined temperature difference value.

According to an optional embodiment of the invention, the temperature moderation device can be integrated with an air conditioning remote control for facilitating an air conditioner in operation control. The temperature moderation device includes a temperature setting element, a remote communication element, an indoor communication element, a storage element, and a processor. The temperature setting element provides a user to set an indoor setting temperature. The remote communication element communicates with the air conditioner. The indoor communication element communicates with an outdoor temperature detection element, for receiving an outdoor temperature. The storage element stores a predetermined temperature difference value, the outdoor temperature, and the indoor setting temperature. The processor is electrically connected to the storage element, for generating a target temperature and sending the target temperature to the air conditioner via the remote communication element for operation control. The target temperature is one selected from the indoor setting temperature and a pre-set temperature by which one is more approximated to the outdoor temperature, and the pre-set temperature is generated by calculating the outdoor temperature and the predetermined temperature difference value.

According to another optional embodiment of the invention, the temperature moderation device can be integrated with an air conditioner to be an air conditioner with temperature difference considerations between indoors and outdoors. The air conditioner with temperature difference considerations between indoors and outdoors, comprises a temperature setting element, an indoor communication element, a storage element, a processor, and a temperature controlling element. The temperature setting element is for providing a user to set an indoor setting temperature. The indoor communication element communicates with an outdoor temperature detection element, for receiving an outdoor temperature. The storage element is for storing a predetermined temperature difference value, the outdoor temperature, and the indoor setting temperature. The indoor temperature detection element is for detecting an indoor temperature. The processor is electrically connected to the storage element and the indoor temperature detection element, for generating a target temperature, and generating an air conditioning control signal according to the target temperature and the indoor temperature. Also, the target temperature is one selected from the indoor setting temperature and a pre-set temperature by which one is more approximate to the outdoor temperature, and the pre-set temperature is generated by calculating the outdoor temperature and the predetermined temperature difference value. The temperature controlling element outputs air outwards the air conditioner, for modulating the indoor temperature, in which the temperature controlling element is able to determine whether to output the air or not according to the air conditioning control signal.

According to another optional embodiment of the invention, the temperature moderation method comprises steps of obtaining a predetermined temperature difference value, an outdoor temperature, and an indoor setting temperature, and generating a target temperature, and sending the target temperature to the air conditioner for operation control, wherein the target temperature is one selected from the indoor setting temperature and a pre-set temperature by which one is more approximate to the outdoor temperature, and the indoor setting temperature is generated by calculating the outdoor temperature and the predetermined temperature difference value.

According to another optional embodiment of the invention, the temperature moderation method is implemented on a temperature moderation system capable of controlling an air conditioner. The temperature moderation method comprises a step of obtaining a predetermined temperature difference value, an outdoor temperature, and an indoor temperature, next, a step of determining whether the indoor temperature is within a temperature standard range, wherein the temperature standard range is a result of the outdoor temperature respectively adding and subtracting the predetermined temperature difference value, and a step of sending a signal for stopping a temperature controlling element to the air conditioner, when the indoor temperature is not within the temperature standard range, or sending a signal for starting a temperature controlling element to the air conditioner, when the indoor temperature is within the temperature standard range.

Since the target temperature generated by the invention is within a temperature range that the human body is tolerable for temperature change, the indoor setting temperature can be controlled in mildness, thus, to lower an electricity usage of the air conditioner.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

A temperature moderation system with temperature difference considerations between indoors and outdoors, its device, its air condition device, and its method thereof are provided. By moderating an indoor temperature, a temperature difference between an indoor temperature and an outdoor temperature can be continually maintained in a temperature range that human body is tolerable for sudden temperature change.

Figure 1:
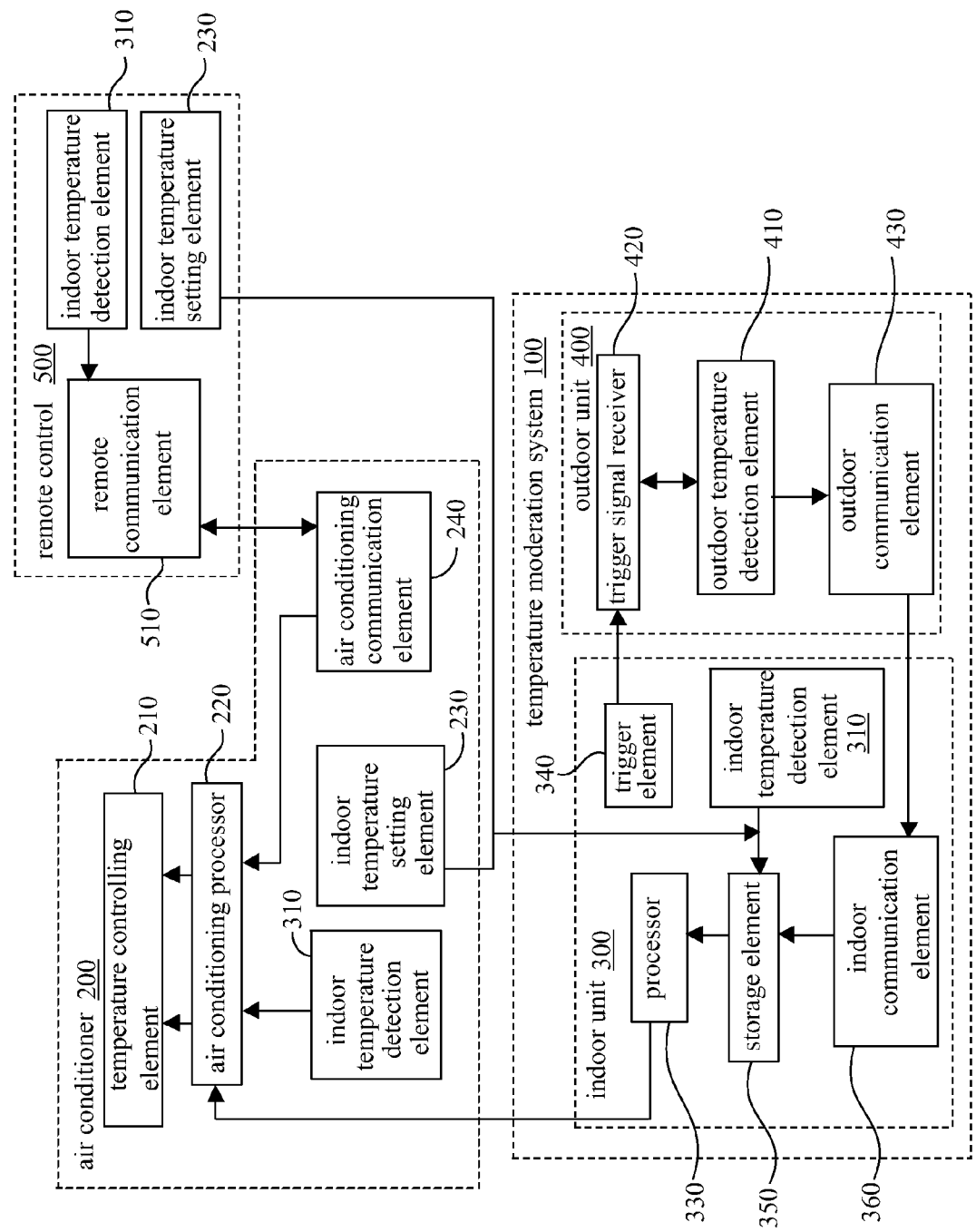
FIG. 1 is a block diagram of a temperature moderation system according to an embodiment of the invention.

FIG. 1 is a block diagram of a temperature moderation system according to an embodiment of the invention. According to the embodiment, the temperature moderation system 100 is implemented to facilitate an air conditioner 200 in operation control. The temperature moderation system 100 includes an outdoor unit 400, and an indoor unit 300.

The air conditioner 200 has a temperature controlling element 210, an air conditioning processor 220, an indoor temperature setting element 230, and an air conditioning communication element 240. The temperature controlling element 210 has a cold-air compressor (or heater) and fans. The temperature controlling element 210 can start the cold-air compressor to output cold air for lowering the indoor temperature, and start the fans to blow the cold air outwards the air conditioner 200. The temperature controlling element 210 also can start the heater to output warm air for raising the indoor temperature up, and start the fans to blow the warm air outwards the air conditioner 200.

The air conditioning processor 220 is electrically connected to the temperature controlling element 210 and the air conditioning communication element 240 which is in communication with a remote communication element 510 of a remote control 500 for receiving an indoor setting temperature sent from the remote control 500, and an indoor temperature detected from the remote control 500.

The outdoor unit 400 at least includes an outdoor temperature detection element 410 and an outdoor communication element 430. The outdoor temperature detection element 410, for example, is a temperature detection circuit or a temperature detection probe, for detecting and collecting outdoor temperatures. The outdoor communication element 430, for example, is a wireless signal-receiving element electrically connected to the outdoor temperature detection element 410.

The indoor unit 300 is electrically connected to the air conditioner 200 for receiving an indoor setting temperature from the air conditioner 200. The indoor unit 300 includes an indoor communication element 360, a storage element 350, and a processor 330. The indoor communication element 360, for example is a wireless signal-transmitting element, communicates with the outdoor communication element 430, for receiving the outdoor temperature. The storage element 350, for example is a memory device, for storing a predetermined temperature difference value, the outdoor temperature, and the indoor setting temperature.

The indoor unit 300 may further have an indoor temperature detection element 310, and the indoor temperature detection element 310, for example is a temperature detection circuit or a temperature detection probe, for detecting and collecting indoor temperatures.

The processor 330, for example is a control chip or a control circuit, is electrically connected to the storage element 350 for generating a target temperature, and sending the target temperature to the air conditioner 200 for operation control.

The target temperature is one selected from the indoor setting temperature and a pre-set temperature by which one is more approximated to the outdoor temperature, and the pre-set temperature is generated by calculating the outdoor temperature and the predetermined temperature difference value.

After the processor 330 obtains the target temperature and the indoor temperature, the processor 330 sends a signal for facilitating the air conditioner 200 in operation control based on a result of comparing the target temperature and the indoor temperature.

For instance, when the indoor temperature does not match with the target temperature, or the indoor temperature is not within a range defined by the target temperature respectively adding and subtracting a certain unit, the processor 330 sends a start signal to the temperature controlling element 210 for outputting cold or heat air outwards the air conditioner 200 with the fans to adjust the indoor temperature.

On the contrary, when the indoor temperature matches with the target temperature, or the indoor temperature is within the range formed by the target temperature respectively adding and subtracting certain units, the processor 330 sends a stop signal to the temperature controlling element 210 for stopping cold or heat air provision, and continuing to provide normal air with the fans.

For example in details for clear illustration, when the indoor temperature is higher than the target temperature, the processor 330 sends a signal for starting the temperature controlling element 210 to the air conditioning processor 220. The air conditioning processor 220 then starts the cold-air compressor of the temperature controlling element 210. On the other hand, when the indoor temperature matches with the target temperature, the processor 330 sends a signal for stopping the temperature controlling element 210 to the air conditioning processor 220. The air conditioning processor 220 then stops the cold-air compressor of the temperature controlling element 210.

Figure 2:
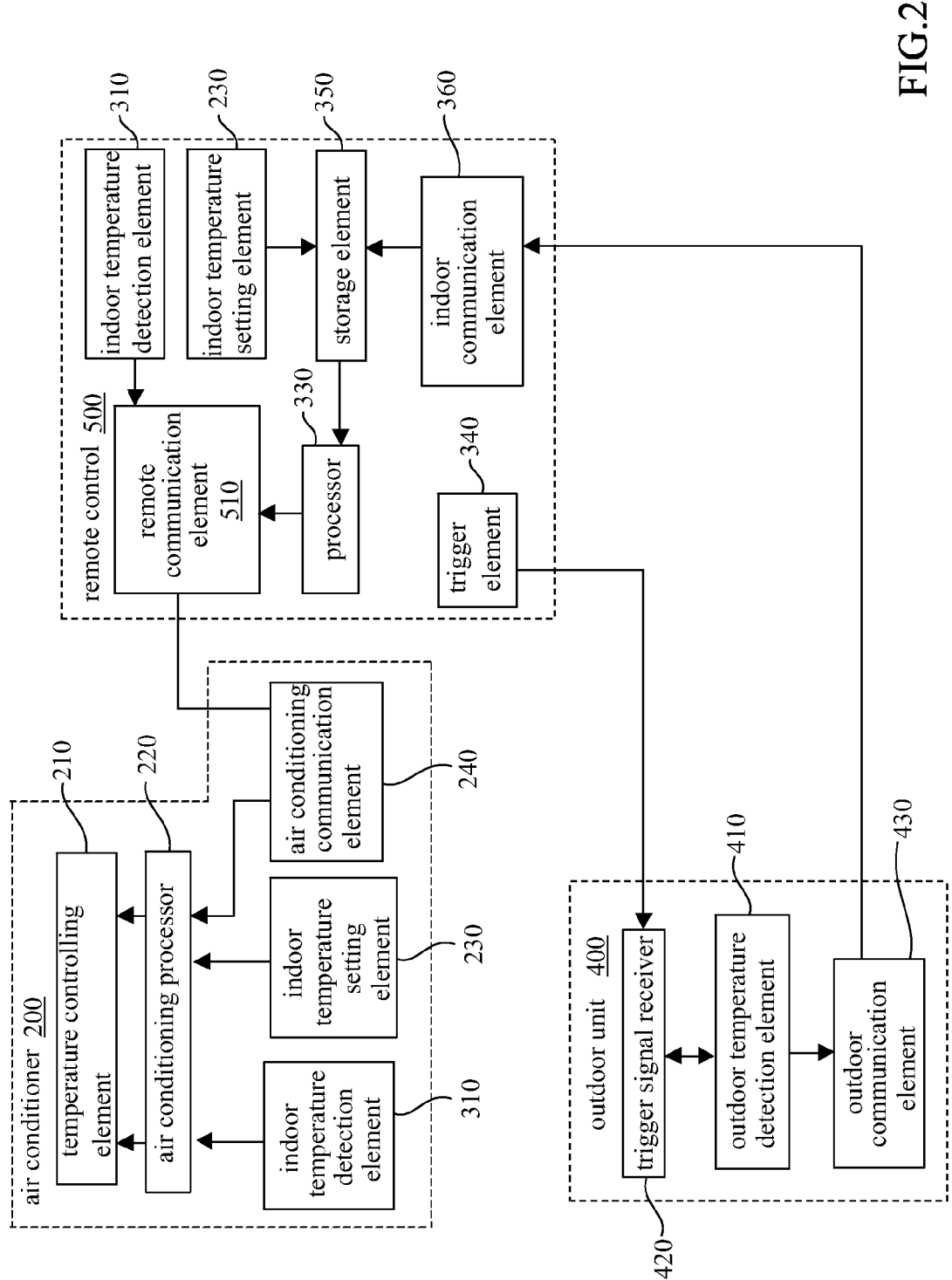
FIG. 2 is a block diagram of a temperature moderation device according to an embodiment of the invention.

FIG. 2 is a block diagram of a temperature moderation device according to an embodiment of the invention. According to an optional embodiment of the invention, the indoor unit 300 can be integrated within a remote control 500. The remote control 500 includes an indoor temperature setting element 230 and a remote communication element 510. The indoor temperature setting element 230 is electrically connected storage element 350, and provides a user to set an indoor setting temperature. The remote communication element 510 is in communication with the air conditioning communication element 240, for passing the indoor setting temperature to the air conditioner 200. Since the processor 330, the storage element 350, and the indoor communication element 360 in the embodiment are as same as mentioned above, they will not be described again in the embodiment.

Thus, when the indoor communication element 360 of the remote control 500 gets outdoor temperature from the outdoor temperature communication element 430 of the outdoor unit 400, the outdoor temperature is saved to the storage element 350 and is provided to the processor 330 for generating the target temperature which is send to the air conditioner 200 via the remote communication element 510.

Furthermore, the processor 330 sends a signal for facilitating the air conditioner in operation control via the remote communication element 510, based on a result of comparing the target temperature and the indoor temperature. The signal is used for facilitating the air conditioner in operation control, such as starting the temperature controlling element 210 to output cold or warm air that capable of changing the indoor temperature.

Figure 3:
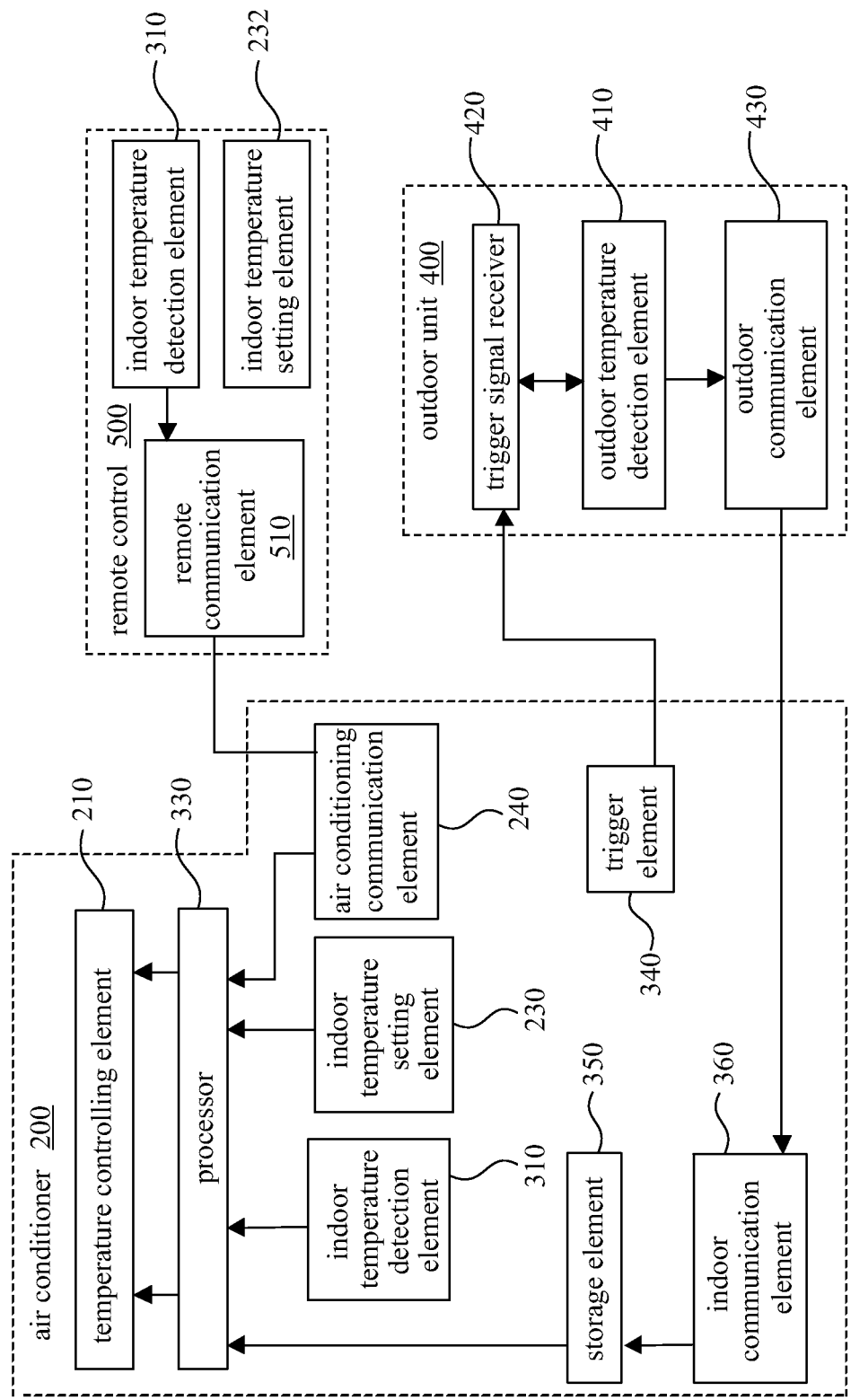
FIG. 3 is a block diagram of the temperature moderation device according to another embodiment of the invention.

FIG. 3 is a block diagram of the temperature moderation device according to another embodiment of the invention. According to another embodiment of the invention, the temperature moderation device 300 can be integrated with an air conditioner 200 to be an air conditioner with temperature difference considerations between indoors and outdoors.

The air conditioning processor 220 mentioned above (see FIG. 1) can be integrated into the processor 330. The processor 330 is electrically connected with the indoor temperature setting element 230. When a user sets an indoor setting temperature by the indoor temperature setting element 230, the indoor setting temperature will be sent to the processor 330.

Therefore, when the indoor communication element 360 of the air conditioner 200 acquires an outdoor temperature by the outdoor communication element 430 of the outdoor unit 400, the outdoor communication element 430 saves the outdoor temperature in the storage element 350, and the processor 330 generates a target temperature by the outdoor temperature stored in the storage element 350.

Then, according to a result of comparing the target temperature and the indoor temperature, the processor 330 directly generates an air conditioning control signal for starting or stopping the temperature controlling element 210 to output the cold air or heat air for changing the indoor temperature.

Refer to FIG. 1 to FIG. 3. According to the embodiments of the invention, the temperature moderation system 100 further has a trigger element 340. The trigger element 340 can be disposed in the indoor unit 300. The outdoor unit 400 further has a trigger signal receiver 420, and the trigger signal receiver 420 is in communication with the trigger element 340 via a wireless communication manner. The outdoor temperature detection element 410 is electrically connected to the outdoor communication element 430 and the trigger signal receiver 420. The indoor communication element 360 is electrically connected to the outdoor communication element 430 and processor 330 in which the indoor communication element 360 is in communication with the outdoor communication element 430 via a wireless communication manner.

Therefore, when the trigger element 340 periodically sends a trigger signal to the trigger signal receiver 420, the trigger signal receiver 420 may then notify the outdoor temperature detection element 410 for starting the detection of the outdoor temperature.

After that, the outdoor communication element 430 sends the outdoor temperature to the storage unit 350 via the indoor communication element 360, so as to provide the outdoor temperature to the processor 330 for generating the target temperature, and comparing the target temperature and the indoor temperature.

The trigger signal receiver 420 and the trigger element 340 obey one of several kinds of wireless protocols. The indoor communication element 360 and the outdoor communication element 430 obey one of several kinds of wireless protocols. These kinds of wireless protocols can be wireless protocol of ZigBee, Infrared transmission, Radio Frequency IDentification (RFID), Bluetooth, and WiFi.

Figure 4:
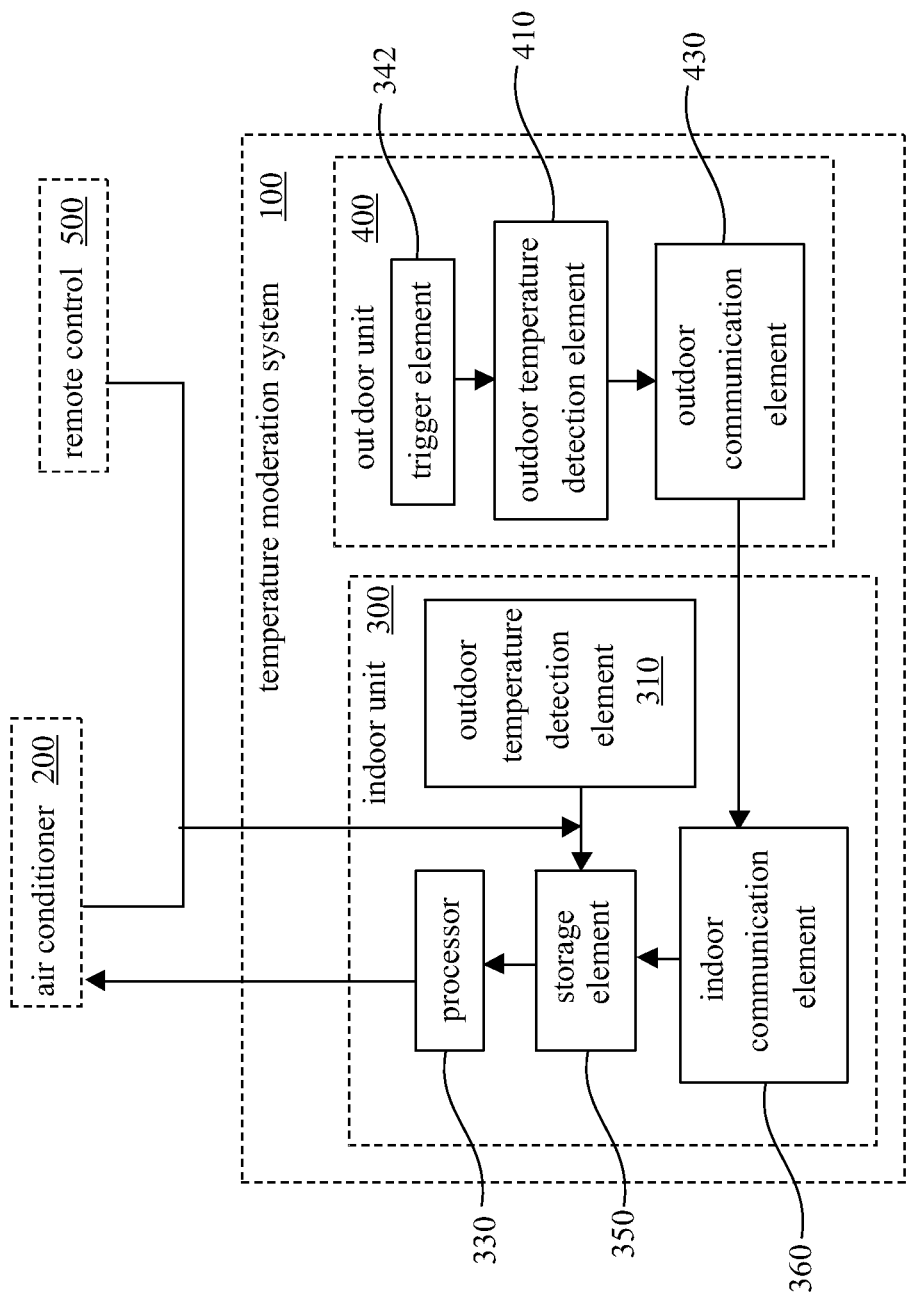
FIG. 4 is a block diagram of the temperature moderation system according to the other embodiment of the invention.

Furthermore, FIG. 4 is a block diagram of the temperature moderation system according to the other embodiment of the invention. A trigger element 342 can be disposed in the outdoor unit 400, and electrically connects to the outdoor temperature detection element 410 to periodically send a trigger signal to the outdoor temperature detection element 410 for starting the detection the outdoor temperature. Thus, the other embodiment of the invention may not need to have a trigger signal receiver with respect to the trigger element 342.

Otherwise, another trigger element or the like can be inbuilt in the outdoor temperature detection element 410 (not shown in FIG. 4) to start the outdoor temperature detection element 410 with the ability of periodically triggering to detect an outdoor temperature.

It is worthy to notice that no matter the indoor unit 300 is integrated in the air conditioner 200 or the remote control 500, the processor 330 can be informed of the current operation mode of cold-air or warm-air output from the air conditioner 200.

The temperature moderation method with temperature difference considerations between indoors and outdoors is generally included into steps of obtaining a predetermined temperature difference value, an outdoor temperature, and an indoor setting temperature, generating a target temperature, and sending the target temperature to the air conditioner 200 for operation control, in which the target temperature is one selected from the indoor setting temperature and a pre-set temperature by which one is more approximated to the outdoor temperature, and the pre-set temperature is generated by calculating the outdoor temperature and the predetermined temperature difference value.

Figure 5:
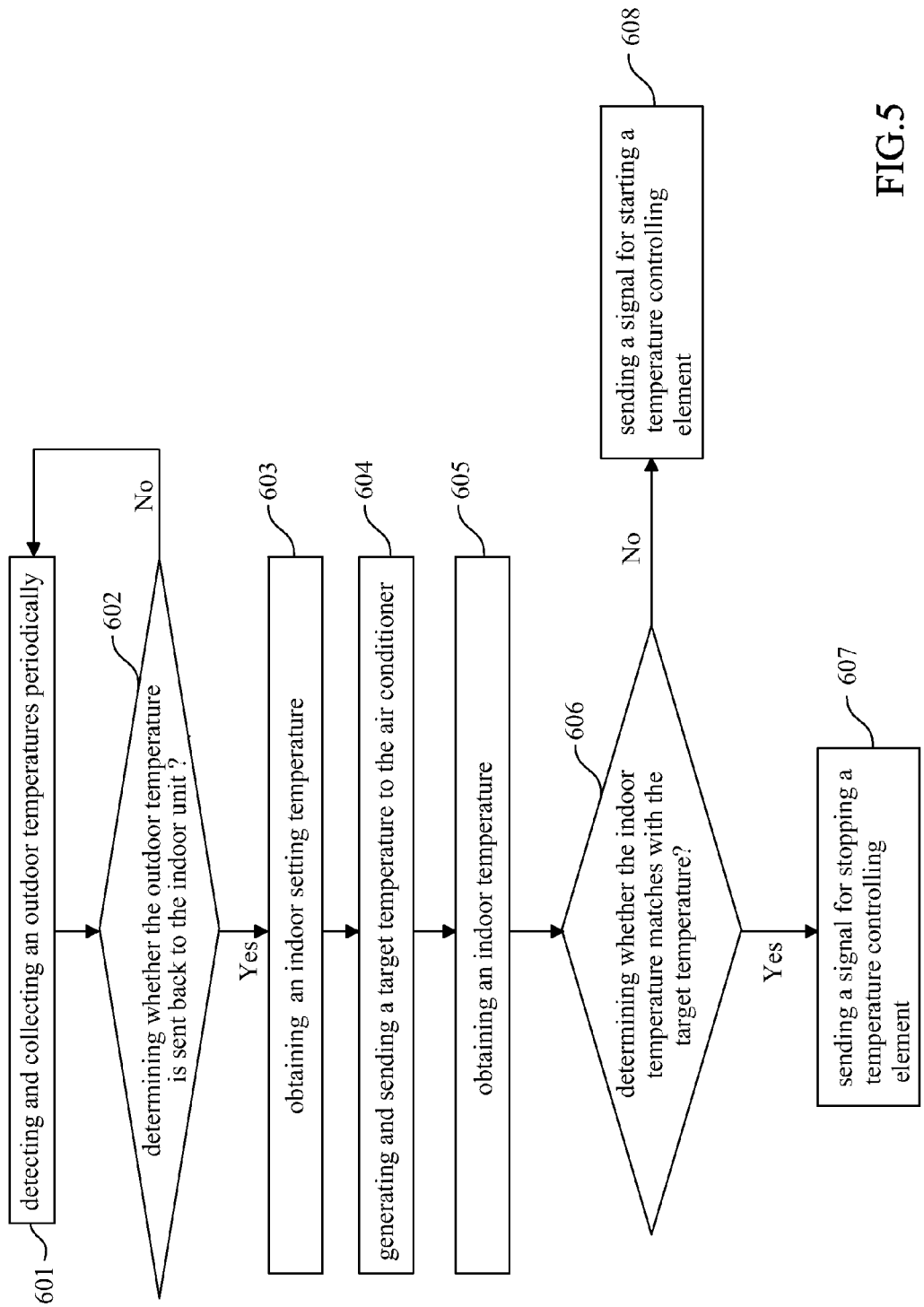
FIG. 5 is a flow chart of a temperature moderation method according to an embodiment of the invention.

According to an embodiment of the invention that the indoor unit 300 is integrated into the air conditioner 200 (as in FIG. 3), a flow chart of a temperature moderation method in FIG. 5 discloses as following:

Step 601: detecting and collecting an outdoor temperature periodically:

In this step, the trigger element 340 will periodically send a trigger signal to the trigger signal receiver 420 of the outdoor unit 400 to begin the method. After receiving the trigger signal, the trigger signal receiver 420 notifies the outdoor temperature detection element 410 to start to detect and collect a current outdoor temperature, and the outdoor temperature detection element 410 sends the outdoor temperature back to the indoor unit 300. In practice, the trigger element 340 sends a trigger signal to the trigger signal receiver 420 of the outdoor unit 400 every 15 minutes, for example. After the step, goes to step 602.

Step 602: waiting and determining whether the outdoor temperature is sent back to the air conditioner 200.

In the step, normally, if all elements mentioned above were operated functionally, the outdoor communication element 430 will send the outdoor temperature back to the indoor communication element 360, and the indoor communication element 360 will send the outdoor temperature to the storage element 350, and then moves to Step 603. However, if one of the elements mentioned above malfunctioned, and the outdoor temperature is not sent back to the air conditioner 200, then Step 602 goes back to Step 601.

In another possibility, when the outdoor temperature is not sent back to the air conditioner 200, Step 602 still moves on to Step 603, and the processor 330 will retrieve an old outdoor temperature from the storage element 350 instead of the current outdoor temperature that is supposed to be received from the outdoor unit 400.

Step 603: obtaining an indoor setting temperature.

In this step, the processor 330 may get an indoor setting temperature from the indoor temperature setting element 230 of the outdoor unit 200, or another indoor temperature setting element 230 inbuilt in the remote control 500. After that, Step 603 moves to Step 604.

Step 604: generating and sending a target temperature to the air conditioner 200.

In Step 604, the target temperature is selected from a pre-set temperature and the indoor setting temperature by which one is more approximate to the outdoor temperature. The pre-set temperature is generated from calculating the outdoor temperature from Step 603, and a predetermined temperature difference value, e.g. 7-9 degrees temperature scale. Thus, the target temperature can be used for facilitating the air conditioner 200 for operation control.

It is worthy to appreciate that since the predetermined temperature difference value may be set manually, or stored in the storage element 350 in advance, and also, the predetermined temperature difference value, for example, can be a variable temperature parameter changeable to different factors such as seasons, countries and geographic areas, thus, the target temperature will be varied corresponding to a different predetermined temperature difference value and a different outdoor temperature.

In this specification, value of temperature practicing in Celsius is only for example, however, the value of temperature is not limited to practice in Celsius or Fahrenheit only.

The method further provides Step 605 to have an indoor temperature.

In Step 605, the indoor temperature detection element 310 starts to collect a current indoor temperature at this moment, and send the current indoor temperature to the processor 330.

Step 606: determining whether the indoor temperature matches with the target temperature.

After the indoor temperature is received, the processor 330 sends a signal for facilitating the air conditioner 200 in operation control based on a result of comparing the target temperature and the indoor temperature. Then, when the indoor temperature matches with the target temperature, the method next goes to Step 607; otherwise, the method next goes to Step 608.

It is worth to note that the way to determine whether the indoor temperature matches with the target temperature further can go with a way to determine whether the indoor temperature is within a temperature range resulted by the target temperature respectively adding and subtracting a determined value.

For example, the outdoor temperature is 35 degrees C., the target temperature is 27 degrees C., and the temperature range is about 26-28 degrees C. Thus, when a detected indoor temperature is less than 26 degrees C., then it is determined that the indoor temperature matches with the target temperature, thus, the method goes to Step 607 for stopping the cold-air compressor but continuing to provide normal air by the fans.

On the other hand, when a detected indoor temperature is higher than 28 degrees C., then it is determined that the indoor temperature does not match with the target temperature, thus, the method goes to Step 608 for starting the cold-air compressor.

For another example, the outdoor temperature is 5 degrees C., the target temperature is 22 degrees C., and the temperature range is about 21-23 degrees C. Thus, when a detected indoor temperature is higher than 23 degrees C., then it is determined that the indoor temperature matches with the target temperature, thus, the method goes to Step 607 for stopping the heater but continuing to provide normal air by the fans.

On the other hand, when a detected indoor temperature is higher than 21 degrees C., then it is determined that the indoor temperature does not match with the target temperature, thus, the method goes to Step 608 for starting the heater.

Step 607: sending a signal for stopping the temperature controlling element 210.

When the processor 330 has determined that the indoor temperature and the target temperature are matched with each other, the processor 330 sends a signal for stopping the temperature controlling element 210 to stop the temperature controlling element 210.

Step 608: sending a signal for starting the temperature controlling element 210.

When the processor 330 has determined that the indoor temperature and the target temperature are not matched with each other, the processor 330 sends a signal for starting the temperature controlling element 210 to request the temperature controlling element 210 to process air conditioning operation control of keeping cold-air or warm-air output.

Figure 6:
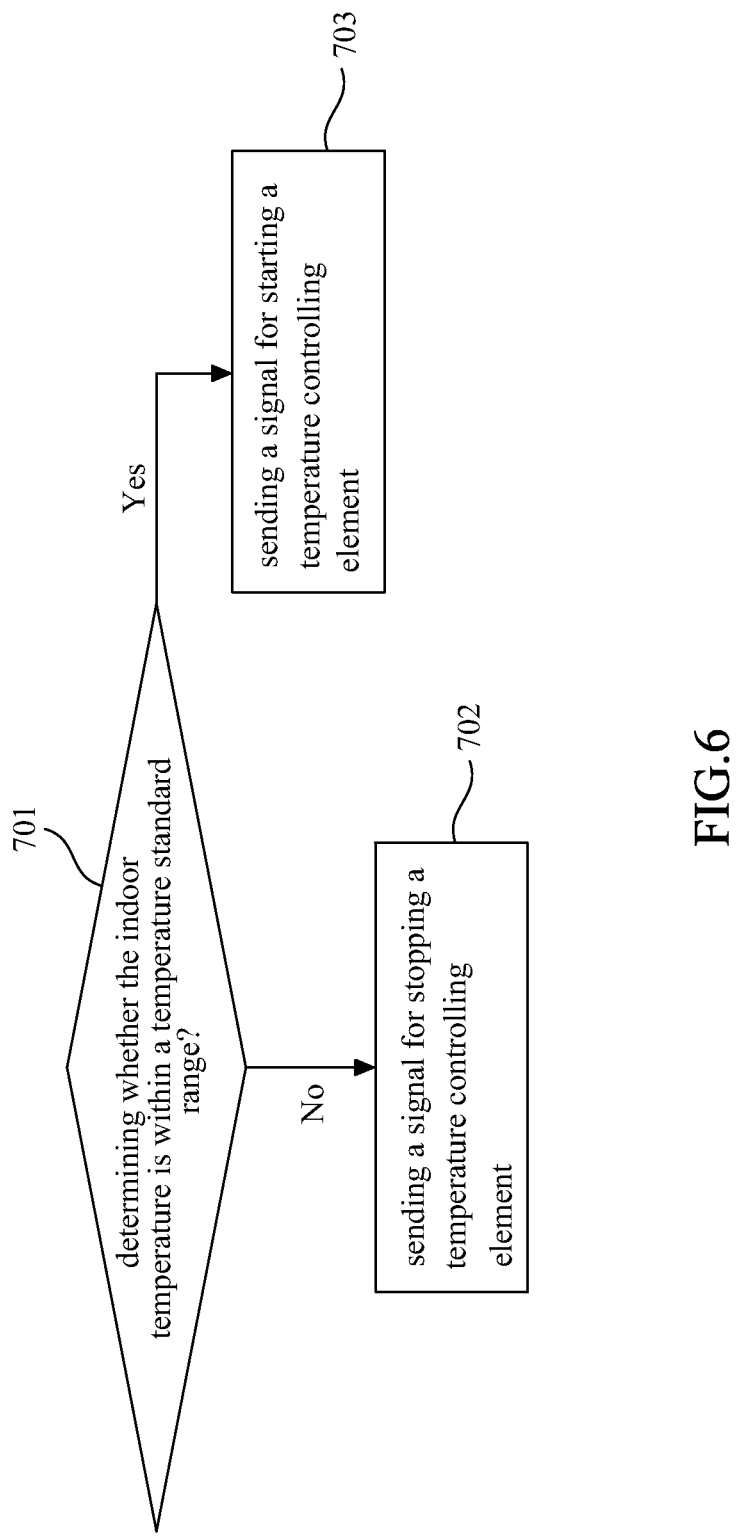
FIG. 6 is a flow chart of a temperature moderation method according to another embodiment of the invention.

FIG. 6 is a flow chart of a temperature moderation method according to another embodiment of the invention. In another embodiment of the invention, Step 701 can be processed after Step 605 is done.

Step 701: determining whether the indoor temperature is within a temperature standard range? If the indoor temperature is within the temperature standard range, the method goes to Step 702, otherwise, it goes to Step 703.

In this step, after the processor 330 gets an indoor temperature, an outdoor temperature and a predetermined temperature difference value, the processor 330 determinates whether the indoor temperature is within a temperature standard range.

What is noteworthy is that the temperature standard range for example can be a temperature range resulted by the outdoor temperature respectively adding and subtracting the predetermined temperature difference value (e.g. 7~9 degrees scale).

For example, the outdoor temperature is 35 degrees C.; the predetermined temperature difference value is 7 degrees, thus, the temperature standard range is within a range from 42 (35+7) degrees C. to 28 (35−7) degrees C. Thus, the indoor temperature can be determined to be within the temperature standard range if the indoor temperature is 30 degrees C., and the indoor temperature can be determined to not be within the temperature standard range if the indoor temperature is 25 degrees C.

Step 702: sending a signal for stopping the temperature controlling element 210.

When the processor 330 determines that the indoor temperature is not within the temperature standard range, it means that the indoor temperature comparing to the outdoor temperature for a human body may be easy to get uncomfortable when the human body moves from indoor to outdoor suddenly. Therefore, the processor 330 can request the temperature controlling element 210 to shut down, so that the indoor temperature can approach the outdoor temperature.

Step 703: sending a signal for starting a temperature controlling element 210.

When the processor 330 determines that the indoor temperature is within the temperature standard range, it means that the indoor temperature comparing to the outdoor temperature for a human body may not be easy to get uncomfortable when the human body moves from indoor to outdoor suddenly. Therefore, the temperature controlling element 210 maintains in status quo.

In sum, the present invention of the temperature moderation system with temperature difference considerations between indoors and outdoors, its device, its air condition device, and its method thereof are able to maintain a temperature difference between indoor and outdoor within a range of temperature that the human body is tolerable for sudden temperature change. Therefore, on one hand, a possibility of the human body being uncomfortable when moving from indoor to outdoor suddenly will be lowered, on the other hand, since the indoor temperature is controlled in mildness, the electricity usage of the air conditioner will be restricted for saving energy.

The temperature moderation system 100 mentioned in the specification is not limited to use in residential houses, office buildings only, others like hospitals, postnatal cares, or museums etc., can be taken into account of the invention. The air conditioner 200 of the temperature moderation system 100 can also be a split-typed household air conditioner/heater or an air conditioner/heater system for office buildings with a chiller and air conditioning cabinet. Besides human health considerations, the invention can adjust the predetermined temperature difference value when aiming for goods (e.g. antique or ancient art works) or plant (e.g. orchid).

Terms mentioned above need to be defined as described as follows:

1. "outdoor temperature" is defined as a value of atmospheric temperature.

2. "outdoor" is defined as a position able to detect the "outdoor temperature".

3. "indoor temperature" is defined as a temperature value indoors which may be cut down or raised up by air conditioner 200.

4. "indoor" is defined as a position able to detect the "indoor temperature".

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A temperature moderation system with temperature difference considerations between indoors and outdoors, implemented for facilitating an air conditioner in operation control, the temperature moderation system comprising:
   an outdoor unit, comprising:
   an outdoor temperature detection element for detecting an outdoor temperature; and
   an outdoor communication element electrically connected to the outdoor temperature detection element; and
   an indoor unit electrically connected to the air conditioner for receiving an indoor setting temperature, the indoor unit comprising:
   an indoor communication element communicating with the outdoor communication element for receiving the outdoor temperature;
   a storage element electrically connected to the indoor communication element for storing a predetermined temperature difference value, the outdoor temperature, and the indoor setting temperature; and a processor electrically connected to the storage element for generating a target temperature, and sending the target temperature to the air conditioner for operation control, wherein the target temperature is one selected from the indoor setting temperature and a pre-set temperature according to which temperature is closest to the outdoor temperature, and the outdoor temperature and the predetermined temperature difference value are calculated together to determine the pre-set temperature.

2. The temperature moderation system with temperature difference considerations between indoors and outdoors as claimed in claim 1, wherein the indoor unit further comprises:
an indoor temperature detection element electrically connected to the storage element, for detecting an indoor temperature, and sending the indoor temperature to the storage element.

3. The temperature moderation system with temperature difference considerations between indoors and outdoors as claimed in claim 2, wherein the processor sends a signal for facilitating the air conditioner in operation control based on a result of comparing the target temperature and the indoor temperature.

4. The temperature moderation system with temperature difference considerations between indoors and outdoors as claimed in claim 3, wherein when the indoor temperature does not match with the target temperature, the processor sends a signal for starting a temperature controlling element to the air conditioner.

5. The temperature moderation system with temperature difference considerations between indoors and outdoors as claimed in claim 3, wherein when the indoor temperature matches with the target temperature, the processor sends a signal for stopping a temperature controlling element to the air conditioner.

6. The temperature moderation system with temperature difference considerations between indoors and outdoors as claimed in claim 1, wherein the outdoor unit further comprises:
a trigger signal receiver electrically connected to the outdoor temperature detection element; and the indoor unit further comprises:
a trigger element periodically sending a trigger signal to the outdoor temperature detection element for starting the detection of the outdoor temperature.

7. The temperature moderation system with temperature difference considerations between indoors and outdoors as claimed in claim 1, wherein the outdoor communication element is a wireless signal transmitter, and the indoor communication element is a wireless signal receiver communicating with the wireless signal transmitter.

8. The temperature moderation system with temperature difference considerations between indoors and outdoors as claimed in claim 7, wherein the wireless signal receiver communicates with the wireless signal transmitter by one of wireless protocols of ZigBee, Infrared transmission, Radio Frequency IDentification (RFID), Bluetooth, and WiFi.

9. The temperature moderation system with temperature difference considerations between indoors and outdoors as claimed in claim 1, wherein the indoor unit is set on a remote control.

10. The temperature moderation system with temperature difference considerations between indoors and outdoors as claimed in claim 1, wherein the outdoor unit further comprises:

a trigger element electrically connected to the outdoor temperature detection element, for periodically enabling the outdoor temperature detection element to detect the outdoor temperature.

11. A temperature moderation device with temperature difference considerations between indoors and outdoors, implemented for facilitating an air conditioner in operation control, the temperature moderation device comprising:
a temperature setting element for providing a user to set an indoor setting temperature;
a remote communication element for communicating with the air conditioner;
an indoor communication element for communicating with an outdoor temperature detection element and receiving an outdoor temperature;
a storage element for storing a predetermined temperature difference value, the outdoor temperature, and the indoor setting temperature; and
a processor electrically connected to the storage element, for generating a target temperature, and sending the target temperature to the air conditioner via the remote communication element for operation control,
wherein the target temperature is one selected from the indoor setting temperature and a pre-set temperature according to which temperature is closest to the outdoor temperature, and the outdoor temperature and the predetermined temperature difference value are calculated together to determine the pre-set temperature.

12. The temperature moderation device with temperature difference considerations between indoors and outdoors as claimed in claim 11, further comprising:
an indoor temperature detection element for detecting an indoor temperature.

13. The temperature moderation device with temperature difference considerations between indoors and outdoors as claimed in claim 12, wherein the processor sends a signal for facilitating the air conditioner in operation control based on a result of comparing the target temperature and the indoor temperature.

14. The temperature moderation device with temperature difference considerations between indoors and outdoors as claimed in claim 13, wherein when the indoor temperature does not match with the target temperature, the processor sends a signal for starting a temperature controlling element to the air conditioner.

15. The temperature moderation device with temperature difference considerations between indoors and outdoors as claimed in claim 13, wherein when the indoor temperature matches with the target temperature, the processor sends a signal for stopping a temperature controlling element to the air conditioner.

16. The temperature moderation device with temperature difference considerations between indoors and outdoors as claimed in claim 11, further comprising:
a trigger element periodically sending a trigger signal to the outdoor temperature detection element for starting the detection of the outdoor temperature.

17. An air conditioner with temperature difference considerations between indoors and outdoors, comprising:
a temperature setting element for providing a user to set an indoor setting temperature;
an indoor communication element for communicating with an outdoor temperature detection element and receiving an outdoor temperature;
a storage element for storing a predetermined temperature difference value, the outdoor temperature, and the indoor setting temperature; and an indoor temperature detection element for detecting an indoor temperature;

a processor electrically connected to the storage element and the indoor temperature detection element, for generating a target temperature, and generating an air conditioning control signal according to the target temperature and the indoor temperature, wherein the target temperature is one selected from the indoor setting temperature and a pre-set temperature according to which temperature is closest to the outdoor temperature, and the outdoor temperature and the predetermined temperature difference value are calculated together to determine the pre-set temperature; and a temperature controlling element for outputting air outwards from the air conditioner for modulating the indoor temperature, wherein the temperature controlling element is able to determine whether to output the air or not according to the air conditioning control signal.

18. The air conditioner with temperature difference considerations between indoors and outdoors as claimed in claim 17, wherein the processor directly generates the air conditioning control signal which starts or stops the temperature controlling element to output the air based on a result of comparing the target temperature and the indoor temperature.

19. The air conditioner with temperature difference considerations between indoors and outdoors as claimed in claim 18, wherein when the indoor temperature does not match with the target temperature, the processor sends a signal to start the temperature controlling element.

20. The air conditioner with temperature difference considerations between indoors and outdoors as claimed in claim 18, wherein when the indoor temperature matches with the target temperature, the processor sends a signal to stop the temperature controlling element.

21. The air conditioner with temperature difference considerations between indoors and outdoors as claimed in claim 17, wherein the temperature controlling element includes a cold-air compressor and a fan.

22. The air conditioner with temperature difference considerations between indoors and outdoors as claimed in claim 17, wherein the temperature controlling element includes heater and a fan.

23. The air conditioner with temperature difference considerations between indoors and outdoors as claimed in claim 17, further comprising:

a trigger element periodically sending a trigger signal to the outdoor temperature detection element for starting the detection of the outdoor temperature.

24. A temperature moderation method with temperature difference considerations between indoors and outdoors, implemented on a temperature moderation system capable of controlling an air conditioner, the temperature moderation method comprising:

obtaining a predetermined temperature difference value, an outdoor temperature, and an indoor setting temperature; and generating a target temperature, and sending the target temperature to the air conditioner for operation control, wherein the target temperature is one selected from the indoor setting temperature and a pre-set temperature according to which temperature is closest to the outdoor temperature, and the outdoor temperature and the predetermined temperature difference value are calculated together to determine the pre-set temperature.

25. The temperature moderation method with temperature difference considerations between indoors and outdoors as claimed in claim 24 further comprising:

obtaining an indoor temperature; and sending a signal for facilitating the air conditioner in operation control based on a result of comparing the target temperature and the indoor temperature.

26. The temperature moderation method with temperature difference considerations between indoors and outdoors as claimed in claim 25, wherein the step of comparing the target temperature and the indoor temperature further comprises:

determining whether the indoor temperature matches the target temperature; and wherein the step of sending the signal for facilitating the air conditioner in operation control, further comprises:

when the indoor temperature does not match with the target temperature, sending a signal for starting a temperature controlling element, or when the indoor temperature matches with the target temperature, sending a signal to stop a temperature controlling element.

27. The temperature moderation method with temperature difference considerations between indoors and outdoors as claimed in claim 24, wherein the step of obtaining the outdoor temperature comprises:

obtaining the outdoor temperature by periodically detecting the outdoor temperature.

28. The temperature moderation method with temperature difference considerations between indoors and outdoors as claimed in claim 27, wherein the step of periodically detecting the outdoor temperature, comprises:

periodically sending a trigger signal by a trigger element to an outdoor temperature detection element for starting the detection of the outdoor temperature.

29. A temperature moderation method with temperature difference considerations between indoors and outdoors, implemented on a temperature moderation system capable of controlling an air conditioner, the temperature moderation method comprising:

obtaining a predetermined temperature difference value, an outdoor temperature, and an indoor temperature;

determining whether the indoor temperature is within a temperature standard range, wherein the temperature standard range is a result of respectively adding and subtracting predetermined temperature difference value to the outdoor temperature; and when the indoor temperature is not within the temperature standard range, sending a signal for stopping a temperature controlling element to the air conditioner, or when the indoor temperature is within the temperature standard range, sending a signal for starting a temperature controlling element to the air conditioner.

30. The temperature moderation method with temperature difference considerations between indoors and outdoors as claimed in claim 29, wherein the step of obtaining the outdoor temperature comprises:

obtaining the outdoor temperature by periodically detecting the outdoor temperature.

31. The temperature moderation method with temperature difference considerations between indoors and outdoors as claimed in claim 30, wherein the step of periodically detecting the outdoor temperature, comprises:

periodically sending a trigger signal by a trigger element to an outdoor temperature detection element for starting the detection of the outdoor temperature.

* * * * *